United States Patent
Olgaard

(10) Patent No.: US 8,312,330 B2
(45) Date of Patent: Nov. 13, 2012

(54) SYSTEM AND METHOD FOR TESTING WIRELESS DEVICES

(75) Inventor: Christian Volf Olgaard, Sunnyvale, CA (US)

(73) Assignee: Litepoint Corporation, Sunnyvale, CA (US)

( * ) Notice: Subject to any disclaimer, the term of this patent is extended or adjusted under 35 U.S.C. 154(b) by 1105 days.

(21) Appl. No.: 11/766,282

(22) Filed: Jun. 21, 2007

(65) Prior Publication Data

US 2008/0320345 A1   Dec. 25, 2008

(51) Int. Cl.
G01R 31/3193    (2006.01)
G01R 31/40      (2006.01)

(52) U.S. Cl. ........................ 714/712; 714/735

(58) Field of Classification Search ............... None
See application file for complete search history.

(56) References Cited

U.S. PATENT DOCUMENTS

| | | | |
|---|---|---|---|
| 4,048,481 A * | 9/1977 | Bailey et al. ............... 714/41 |
| 4,833,676 A | 5/1989 | Koo | |
| 4,897,842 A | 1/1990 | Herz | |
| 5,138,608 A | 8/1992 | Kucera et al. | |
| 5,910,977 A | 6/1999 | Torregrossa | |
| 6,049,895 A * | 4/2000 | Sugimoto ............... 714/46 |
| 6,122,761 A * | 9/2000 | Park ............... 714/724 |
| 6,611,867 B1 * | 8/2003 | Bowman-Amuah ........ 709/224 |
| 6,753,693 B2 | 6/2004 | Seo et al. | |
| 6,870,392 B2 | 3/2005 | Kilian et al. | |
| 6,896,086 B2 | 5/2005 | Scholten | |
| 7,057,518 B2 | 6/2006 | Schmidt | |
| 7,222,261 B2 * | 5/2007 | Song ............... 714/30 |
| 7,463,140 B2 | 12/2008 | Schmidt | |
| 7,564,893 B2 | 7/2009 | O'Neill | |
| 7,890,822 B2 | 2/2011 | Behziz et al. | |
| 2002/0194248 A1 * | 12/2002 | Wood et al. ............... 709/102 |
| 2003/0083838 A1 | 5/2003 | Barrett et al. ............... 702/117 |
| 2004/0162898 A1 | 8/2004 | Rich ............... 709/224 |
| 2005/0107977 A1 * | 5/2005 | Edwards et al. ............... 702/118 |
| 2006/0064266 A1 * | 3/2006 | Mok ............... 702/117 |
| 2006/0104218 A1 * | 5/2006 | Kako ............... 370/252 |
| 2006/0276989 A1 | 12/2006 | Ludwig et al. ............... 702/122 |
| 2007/0198881 A1 * | 8/2007 | Volkerink et al. ............... 714/724 |

OTHER PUBLICATIONS

International Search Report for PCT/US08/66834, dated Sep. 23, 2008.
Written Opinion for PCT/US08/66834, dated Sep. 23, 2008.
International Preliminary Report on Patentability (IPRP) corresponding to International Application No. PCT/US2008/066834, International Bureau of WIPO, dated Dec. 22, 2009, 6 pages.

* cited by examiner

*Primary Examiner* — Ajay Bhatia
*Assistant Examiner* — Dipakkumar Gandhi

(57) ABSTRACT

A system for testing a communication device includes a testing module, a measurement module, and a control module. The testing module transmits one or more first test signals based on a first test sequence. The measurement module acquires test data by receiving one or more second test signals that are based on the one or more first test signals. The control module initiates the first test sequence in response to receiving a start test signal from an analysis system. The control module transfers the test data to the analysis system in response to a transfer data request. The control module initiates a second test sequence while the analysis system is analyzing the test data. The testing module generates and transmits one or more third test signals based on the second sequence when the second test sequence has been initiated.

21 Claims, 10 Drawing Sheets

SYSTEM AND METHOD FOR TESTING WIRELESS DEVICES

BACKGROUND

1. Field of the Invention

The present disclosure relates to wireless communication systems, and more particularly to production testing of wireless communication systems.

2. Related Art

As the number and uses of wireless communication systems increase, it has become increasingly important to the manufacturers of such systems to perform production testing of the wireless transceivers embedded in such systems in a more time-efficient manner. Referring to FIG. 1, a typical test setup includes a device under test (DUT) 100, test equipment 102, and a computer 104. The DUT 100 is operatively coupled to the test equipment 102 and the computer 104 via interfaces 106 and 108, respectively. The test equipment 102 and the computer 104 are operatively coupled via interface 110.

The computer 104 controls the testing of the DUT 100. More specifically, the computer 104 runs production test software that controls the DUT 100 through interface 108. Typically, the computer 104 will control the DUT 100 to operate in a particular mode for testing a particular feature of the DUT 100. When in the particular mode, the DUT 100 communicates with the test equipment 102 via interface 106. The test equipment 106 measures data based on the communication with the DUT 100 operating in the particular mode. The computer 104 collects and analyses the measured data from the test equipment 102.

In one known embodiment, the computer 104 controls the test in a sequential manner as shown in the timing diagram of FIG. 2. The computer 104 starts the test by issuing a start test signal to the test equipment 102 at time 200. The test equipment 102 starts testing the DUT 100 at time 202. The test equipment 102 interacts with the DUT 100 and acquires test data based on the interaction during time 204. The test equipment 102 sends the computer 104 a message indicating that the measured data has been acquired at time 206. The computer 104 subsequently sends a retrieve data signal to the test equipment 102 at time 208. The data is transferred from the test equipment 102 to the computer 104 at time 210. The computer 104 begins to analyze the data at time 212. During time 214, the computer 104 analyzes the data. Once the computer 104 has finished analyzing the data at time 216, the computer 104 can issue a second start test signal at time 218 to start a second test of the DUT 100.

In a similar manner, the test equipment 102 starts testing the DUT 100 at time 220. The test equipment 102 interacts with the DUT 100 and acquires test data based on the interaction during time 222. The test equipment 102 sends the computer 104 a message indicating that the measured data has been acquired at time 224. The computer 104 subsequently sends a retrieve data signal to the test equipment 102 at time 226. The data is transferred from the test equipment 102 to the computer 104 at time 228. The computer 104 begins to analyze the data at time 230. During time 214, the computer 104 analyzes the data.

As shown, using conventional testing systems and methods, time efficiency is limited by controlling the DUT 100 rather than by measuring data based on the communication between the DUT 100 and the test equipment 102. Therefore, it is desirable, among other things, to provide a more time efficient system and method for testing wireless communication systems.

SUMMARY

In one example, a system for testing a communication device includes a testing module, a measurement module, and a control module. The testing module transmits one or more first test signals based on a first test sequence. The measurement module acquires test data by receiving one or more second test signals that are based on the one or more first test signals. The control module initiates the first test sequence in response to receiving a start test signal from an analysis system. The control module transfers the test data to the analysis system in response to a transfer data request. The control module initiates a second test sequence while the analysis system is analyzing the test data. The testing module transmits one or more third test signals based on the second sequence when the second test sequence has been initiated.

In one example, the testing system includes memory that stores the test data. In one example, the control module sends a sequence complete signal to the analysis system when the test data has been acquired.

In one example, a system for testing a communication device includes a test control module, a data analysis module, and a monitoring module. The test control module generates a start test signal and communicates the start test signal to a testing system. The data analysis module analyzes test data acquired by the testing system while the testing system acquires additional test data based on a second test sequence. The monitoring module monitors capacity of the data analysis module. The monitoring module requests a transfer of the test data from the testing system to the data analysis module when the capacity is sufficient to analyze the test data and when a sequence complete signal is received indicating that a predetermined test sequence is complete.

In one example, the capacity is sufficient when the data analysis module is not analyzing the test data. In one example, the capacity is sufficient when at least one processor core of the data analysis module is not analyzing the test data. In one example, the data analysis module includes memory and the capacity is sufficient when the memory has capacity to store the test data.

DETAILED DESCRIPTION

Figure 1:
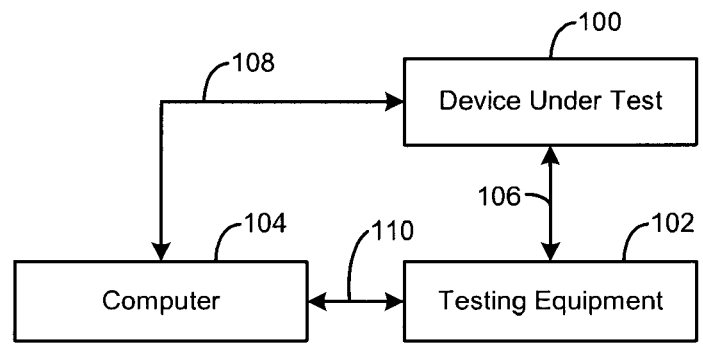
FIG. 1 is a functional block diagram of a wireless communication system in a production test environment according to the prior art.
Figure 2:
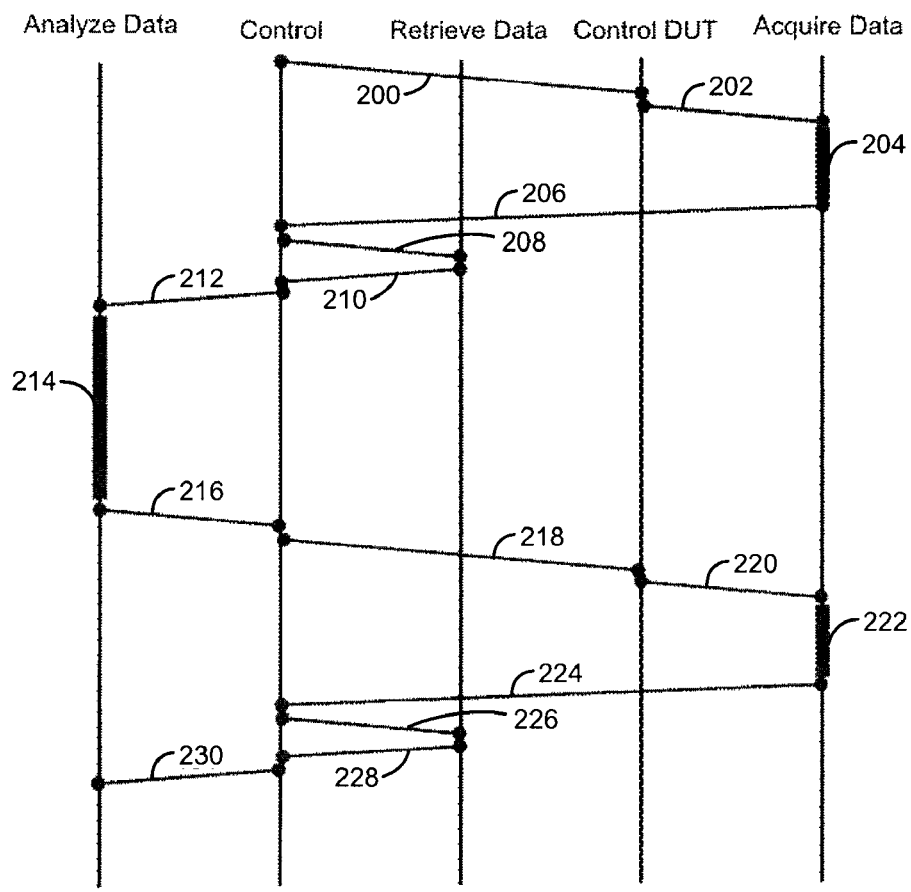
FIG. 2 is an exemplary timing diagram of the production test environment testing the wireless communication system according to the prior art.

The following description of the embodiments is merely exemplary in nature and is in no way intended to limit the invention, its application, or uses. For purposes of clarity, the same reference numbers will be used in the drawings to identify similar elements. The embodiments are described in sufficient detail to enable one of ordinary skill in the art to practice the disclosure, and it will be understood that other embodiments may be practiced with some variations without departing from the spirit or scope of the subject invention.

As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. Absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described functionality. Additionally, the term "signal" may refer to one or more currents, one or more voltages, or a data signal. The phrase at least one of A, B, and C should be construed to mean a logical (A or B or C), using a non-exclusive logical or. Further, while the present disclosure has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Increased time efficiency of a system and method for testing a wireless device under test can be realized by acquiring and analyzing test data from the wireless device independently. The increased time efficiency allows for a wireless device under test to be tested more quickly than by conventional systems and methods. In addition, by multitasking the acquisition and analysis of test data, time efficiency can be further improved. Other advantages will be recognized by those of ordinary skill in the art.

Figure 3:
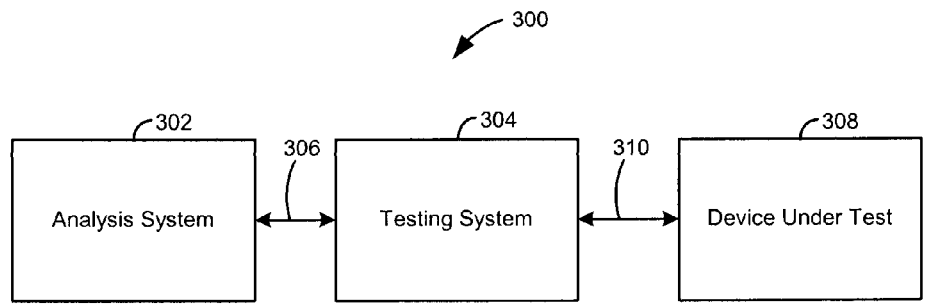
FIG. 3 is an exemplary functional block diagram a system for testing a wireless communication device according to the presently claimed invention.

Referring now to FIG. 3, an improved system 300 for production testing of wireless communication systems is depicted. The system 300 includes an analysis system 302, such as a computer, laptop, or other suitable device and a testing system 304. The analysis system 302 is operatively coupled to the testing system 304 via interface 306 such as a universal serial bus (USB), a general purpose interface bus (GPIB), Ethernet, or any other suitable interface. The system 300 communicates with a device under test (DUT) 308 via interface 310, which can be a wireless interface, but for production testing is usually a wired interface.

The system 300 interacts with the DUT 308 and acquires test data based on the interaction. More specifically, the analysis system 302 issues a start test signal to the testing system 304. In response to receiving the start test signal, the testing system 304 transmits one or more transmit test signals based on one or more predetermined test sequences. The testing system 304 acquires measured test data by receiving one or more test signals from the DUT 308 that are based on the transmit test signals. Once the test data has been acquired for a first test sequence, the testing system 304 transmits one or more transmit test signals based on an additional predetermined test sequences. The analysis system 302 receives and analyzes the measured test data while the testing system 304 continues to acquire additional measured test based on the additional test sequences. Accordingly, the system 300 acquires test data in a more time efficient manner since the testing system 304 does not need to wait for the analysis system 302 to finish analyzing data before acquiring new test data.

Figure 4:
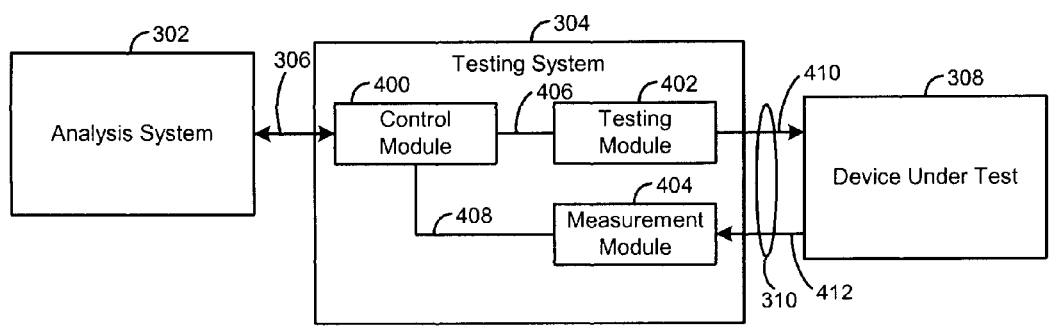
FIG. 4 is an exemplary functional block diagram of a testing system associated with a system for testing a wireless communication device accordingly to the presently claimed invention.

Referring now to FIG. 4, the testing system 304 includes a control module 400, a testing module 402, and a measurement module 404. The control module 400 is operatively coupled to the analysis system 302 via interface 306. The control module 400 is also operatively coupled to the testing module 402 and the measurement module 404 via interfaces 406 and 408, respectively. The testing module 402 and the measurement module 404 are operatively coupled to the DUT 308 via interface 310.

During operation, the analysis system 302 issues a start test signal to the testing system 304 via interface 306. In response to receiving the start test signal, the control module 400 initiates one or more predetermined test sequences. The testing module 402 transmits one or more transmit test signals 410 based on the predetermined test sequences. In response to receiving the transmit test signals 410, the DUT transmits one or more test signals 412 based thereon. The measurement module 404 acquires and measures test data based on the test signals 412.

Once the measurement module 404 has acquired the test data, the control module 400 sends a sequence complete signal to the analysis system 302 that indicates that a first predetermined test sequence is complete and that the test data is available for analysis. In response to receiving the sequence complete signal, the analysis system 302 sends a transfer data signal to the control module 400. When the control module 400 receives the transfer data signal, the control module 400 transfers the test data from the measurement module 404 to the analysis system 302.

Once the test data has been transferred to the analysis system 302, the control module 400 initiates an additional test sequence while the analysis system 302 analyzes the test data. The testing module 402 transmits one or more transmit test signals 410 based on the additional test sequence. The measurement module 404 acquires and measures test data based on the test signals 412 that are based on transmit signals 410. In this manner, the system 300 can multitask the acquisition and analysis of the test data thereby increasing time efficiency when testing the DUT 308.

Figure 5:
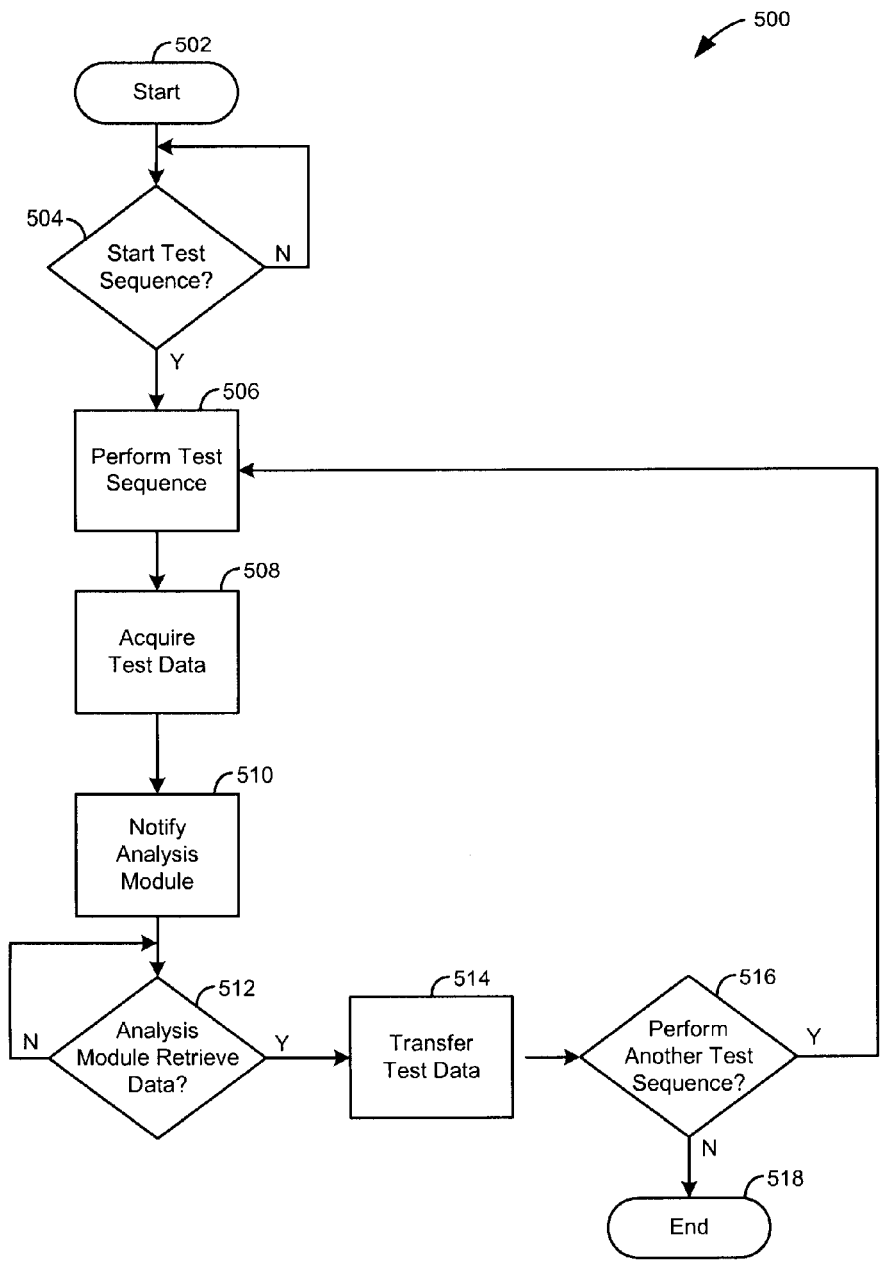
FIG. 5 is a flowchart depicting exemplary steps that can be taken by the testing system of FIG. 4.

Referring now to FIG. 5, a flowchart depicting exemplary steps that can be taken by the testing system 304 is generally identified at 500. The process starts in step 502. In step 504, the control module 400 determines whether the analysis system 302 has requested a test of the DUT 308. As previously discussed, the analysis system 302 sends a start test signal via interface 306 to request a test of the DUT 308. If the analysis system 302 does not request a test of the DUT 308, the process returns to step 504. However, if the analysis system 302 does request a test of the DUT 308, the control module 400 initiates a predetermined test sequence and the testing module 402 transmits one or more transmit test signals 410 based thereon in step 506.

In step 508, the measurement module 404 acquires and measures test data based on the test signals 412 that are based on the transmit test signals 410. Once the measurement module 404 has acquired the measured test data, the control module 400 sends a test sequence complete signal via interface 306 to the analysis system 302 in step 510. In step 512, the control module 400 determines whether the analysis system 302 has requested the control module 400 to transfer the test data to the analysis system 302. If the analysis system 302 has not requested the test data to be transferred, the process returns to step 512. However, if the analysis system 302 has requested the test data to be transferred, the control module 400 transfers the measured test data to the analysis system 302 in step 514.

In step 516, the control module 400 determines whether an additional test sequence is required for testing the DUT 308. If an additional test sequence is required, the process returns to step 506. However, if an additional test sequence is not required, the process ends at step 518.

Figure 6:
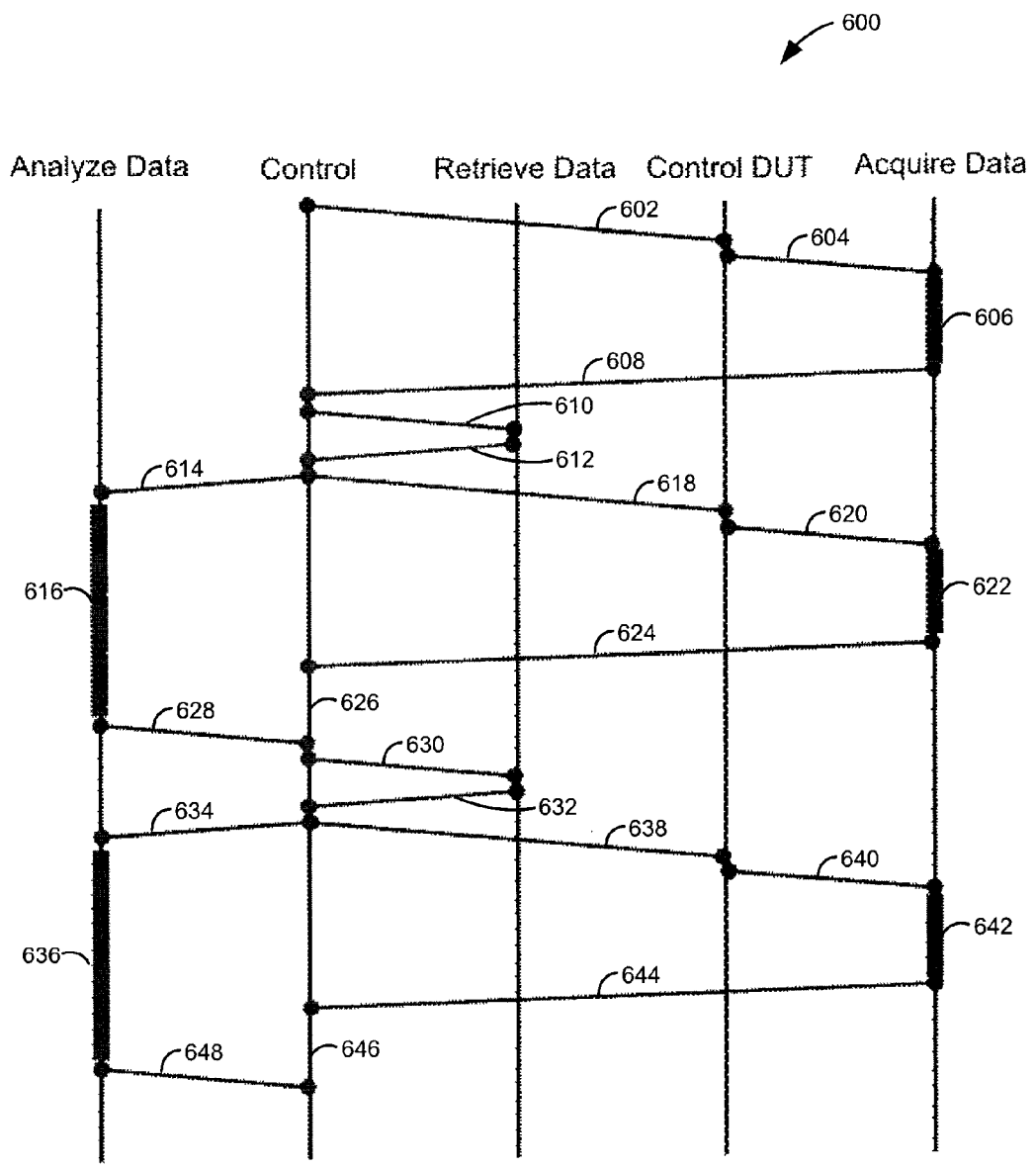
FIG. 6 is an exemplary timing diagram of the system of FIG. 4 testing a wireless communication device according to one embodiment of the present disclosure.

Referring now to FIG. 6, a timing diagram of the system 300 multitasking the acquisition and analysis of the test data is generally identified at 600. At time 602, the testing system 304 begins to test the DUT 308 in response to receiving the start test signal from the analysis system 302. The control module 400 initiates a first predetermined test sequence at time 604. During time 606 the testing module 402 transmits one or more transmit test signals 410 based on the first test sequence to the DUT 308. In addition, the measurement module 404 acquires and measures test data based on one or more test signals 412 that are based on the transmit test signals 410 during time 606.

At time 608, the control module 400 sends a sequence complete signal to the analysis system 302 to notify the analysis system 302 that the measured data has been acquired. At time 610, the analysis system 302 requests the test data to be transferred from the testing system 304. The analysis system 302 notifies the control module 400 when the test data has been received at time 612. At time 614, the analysis system 302 begins to analyze the test data. The analysis system 302 analyzes the test data during time 616.

In parallel to the analysis system 302 analyzing the test data, the control module 400 begins an additional test of the DUT 308 at time 618. The control module 400 initiates a second predetermined test sequence at time 620. During time 622 the testing module 402 transmits one or more transmit test signals 410 based on the second test sequence. In addition, the measurement module 404 acquires and measures test data based on one or more test signals 412 that are based on the transmit test signals 410 during time 622.

At time 624, the control module 400 sends a sequence complete signal to the analysis system 302. During time 626, the analysis system 302 does not have capacity to receive the newly acquired test data, thus the testing system 304 waits for the analysis system 302 to finish analyzing the previously acquired test data. At time 628, the analysis system 302 finishes analyzing the previously acquired test data and notifies the testing system 304 that the analysis system 302 has capacity to analyze the newly acquired test data. At time 630, the analysis system 302 requests the newly acquired test data to be transferred from the testing system 304. The analysis system 302 notifies the control module 400 when the test data has been retrieved at time 632. At time 634, the analysis system 302 begins to analyze the test data. During time 634, the analysis system 302 processes and analyzes the test data.

In parallel to the analysis system 302 analyzing the test data, the control module 400 starts an additional test at time 638. The control module 400 initiates a third predetermined test sequence at time 640. During time 642 the testing module 402 transmits one or more transmit test signals 410 based on the third test sequence. In addition, the measurement module 404 acquires and measures test data based on one or more test signals 412 that are based on the transmit test signals 410 during time 642.

At time 644, the control module 400 sends a sequence complete signal to the analysis system 302. At time 646, the testing system 304 waits for the analysis system 302 to have capacity to analyze the newly acquired test data. At time 648, the analysis system 302 finishes analyzing the previously acquired data and notifies the testing system 304 that the analysis system 302 has capacity for the newly acquired test data.

As shown in the timing diagram, time efficiency is improved by multitasking the acquisition and analysis of the test data. Furthermore, skilled artisans will recognize that more or less predetermined sequences may be used when multitasking the acquisition and analysis of the test data from the DUT 308.

Figure 7:
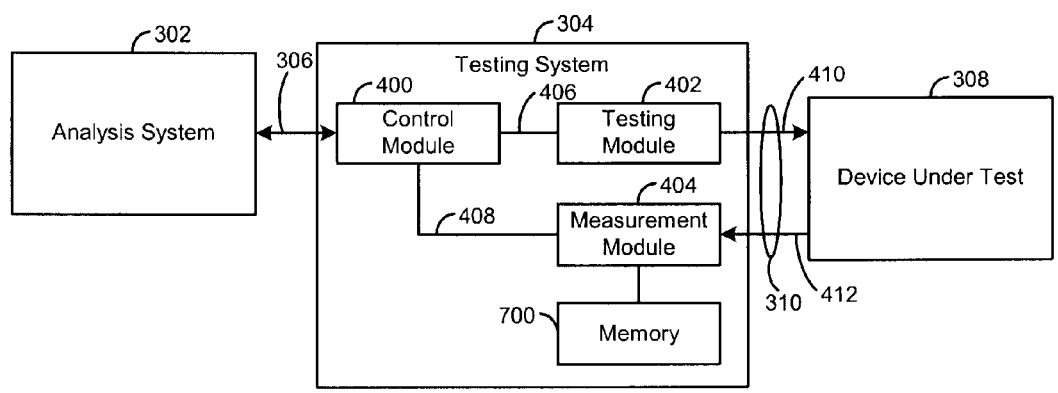
FIG. 7 is an exemplary functional block diagram of an alternate embodiment of a testing system according to the presently claimed invention.

Referring now to FIG. 7, in some embodiments of the testing system 304 includes memory 700 operatively coupled to the measurement module 404. The memory 700 stores the test data once it has been acquired. In this embodiment, the control module 400 can initiate an additional test sequence before the test data is transferred to the analysis system 302. In this manner, the testing system 304 can continue to acquire test data independent of the analysis system 302 analyzing the test data. Once the analysis system 302 has capacity to analyze the newly acquired test data (e.g., the analysis system 302 is not currently analyzing previously acquired test data), the analysis system 302 requests a transfer of the test data from the memory 700 of the testing system 304. By operating the testing system 304 and the analysis system 302 independently, the time efficiency can be further increased.

Figure 8:
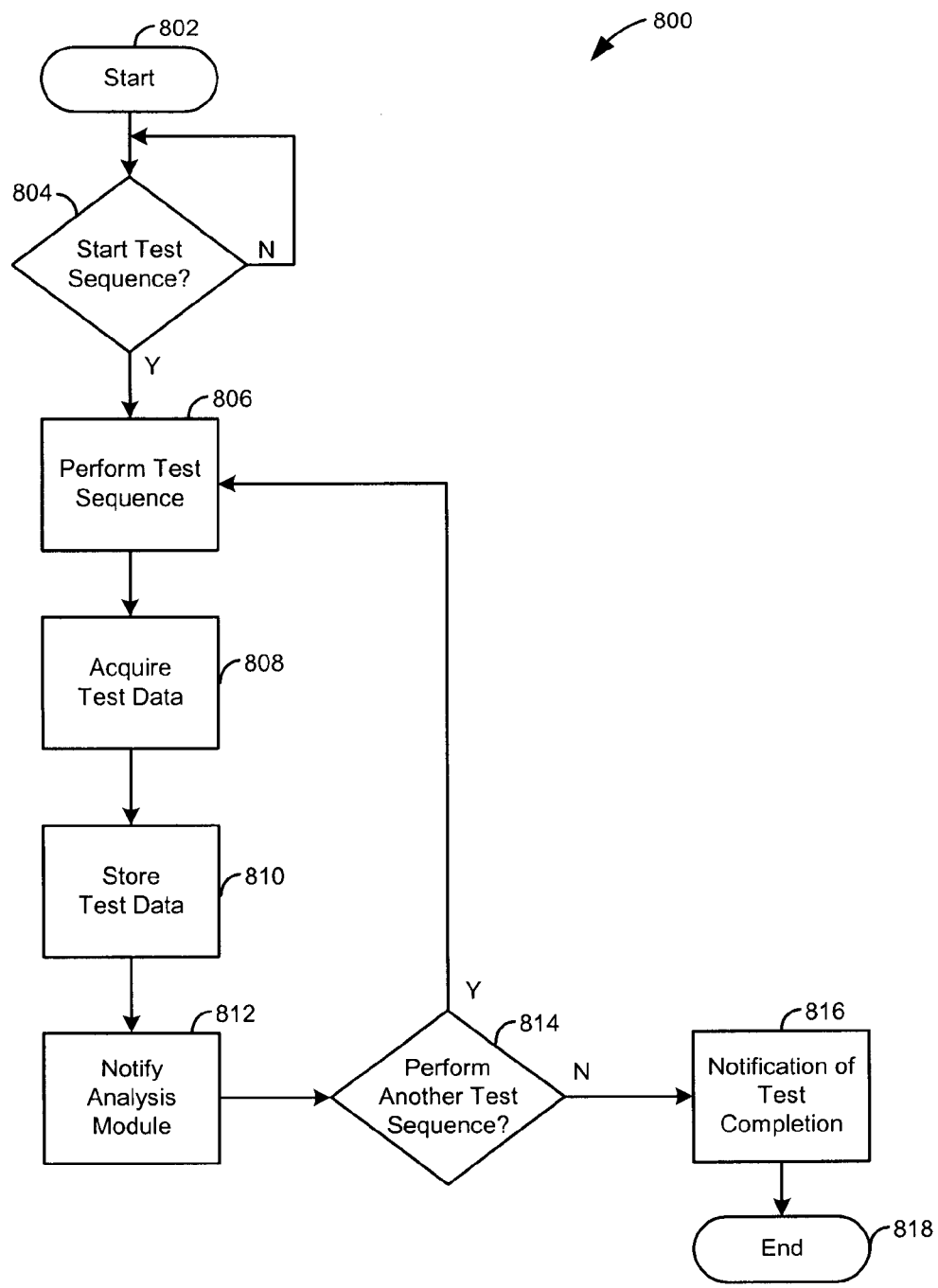
FIG. 8 is a flowchart depicting exemplary steps that can be taken by the testing system of FIG. 7.

Referring now to FIG. 8, a flowchart depicting exemplary steps that can be taken by the testing system 304 having memory 700 is generally identified at 800. The process starts in step 802. In step 804, the control module 400 determines whether the analysis system 302 has requested a test of the DUT 308. As previously discussed, the analysis system 302 sends a start test signal via interface 316 to request a test of the DUT 308. If the analysis system 302 does not request a test of the DUT 308, the process returns to step 804. However, if the analysis system 302 does request a test of the DUT 308, the control module 400 initiates a predetermined test sequence and the testing module 402 transmits one or more transmit test signals 410 based thereon in step 806.

In step 808, the measurement module 404 acquires test data based on the transmit test signals 410. Once the measurement module 404 has acquired the test data, the measurement module 404 stores the test data in memory 700 in step 810. In step 812, control module 400 sends a test sequence complete signal via interface 306 to the analysis system 302. In step 814, the control module 400 determines whether an additional test sequence is required for testing the DUT 308. If an additional test sequence is required, the process returns to step 806. However, if an additional test sequence is not required, the control module 400 notifies the analysis system 302 that the test is complete in step 816 and process ends at step 818.

Figure 9:
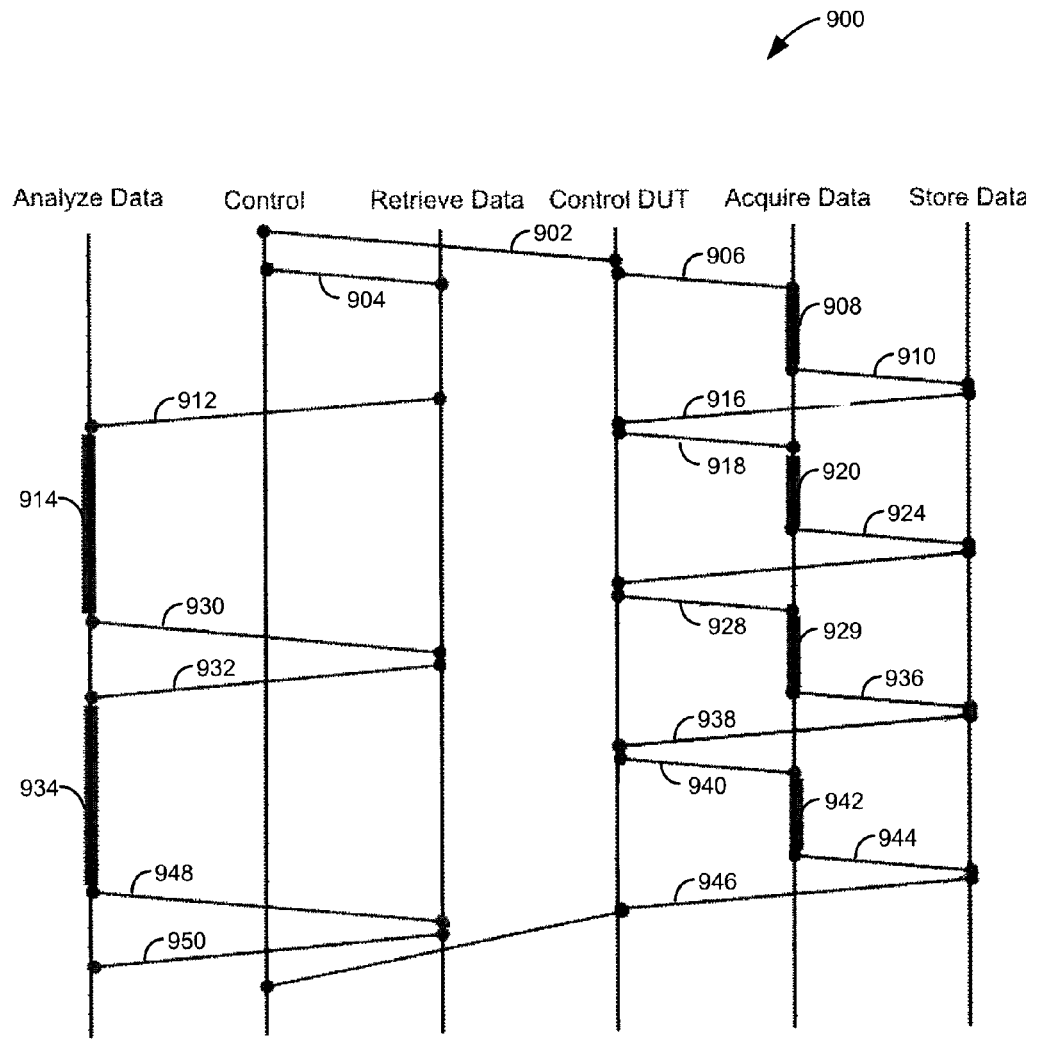
FIG. 9 is an exemplary timing diagram of the system of FIG. 7, having the alternate embodiment of the testing system, testing a wireless communication device.

Referring now to FIG. 9, a timing diagram of the system 300 using the testing system 304 having memory 700 to acquire the test data independent of analyzing the test data is generally identified at 900. At time 902, the testing system 304 begins to test the DUT 308 in response to receiving a start test signal from the analysis system 302. The analysis system 302 subsequently requests a transfer of test data from the testing system 304 at time 904. The control module 400 initiates a first predetermined test sequence at time 906. During time 908 the testing module 402 transmits one or more transmit test signals 410 based on the first test sequence. In addition, the measurement module 404 acquires test data based on one or more test signals 412 that are based on the transmit test signals 410 during time 908. At time 910, the measurement module 404 stores the test data in memory 700. At time 912, the control module 400 transfers the test data from memory 700 to the analysis system 302. Once the data has been transferred to the analysis system 302, the analysis system 302 analyzes the data during time 914.

In parallel to the analysis system 302 analyzing the test data during time 914, the control module 400 begins an additional test of the DUT 308 at time 916. The control module 400 initiates a second predetermined test sequence at time 918. During time 920 the testing module 402 transmits one or more transmit test signals 410 based on the second test sequence. In addition, the measurement module 404 acquires test data based on one or more test signals 412 that are based on the transmit test signals 410 during time 920.

At time 924, the measurement module 404 stores the newly acquired test data in memory 700. The control module 400 begins an additional test of the DUT 308 at time 926. The control module 400 initiates a third predetermined test sequence at time 928. During time 929 the testing module 402 transmits one or more transmit test signals 410 based on the third test sequence. In addition, the measurement module 404 acquires additional test data based on one or more test signals 412 that are based on the transmit test signals 410 during time 920.

At time 930, the analysis system 302 finishes analyzing the previous test data and notifies the testing system 304 to transfer the newly acquired test data to the analysis system 302. At time 932, the control module 400 transfers the newly acquired test data from memory 700 to the analysis system 302. Once the data has been transferred to the analysis system 302, the analysis system 302 analyzes the data during time 934. At time 936, the testing system 304 finishes the additional test on the DUT 308 and stores newly acquired test data in memory 700.

In parallel to the analysis system 302 analyzing the data during time 934, the control module 400 begins an additional test of the DUT 308 at time 938. The control module 400 initiates a fourth predetermined test sequence at time 940. During time 942 the testing module 402 transmits one or more transmit test signals 410 based on the fourth test sequence. In addition, the measurement module 404 acquires test data based on one or more test signals 412 that are based on the transmit test signals 410 during time 942. Once the test data has been acquired, the measurement module 404 stores the newly acquired test data in memory at time 944.

At time 946, the testing system 304 notifies the analysis system 302 that testing of the DUT 308 is complete. At time 948, the analysis system 302 finishes analyzing the previously acquired test data and requests the control module 400 to transfer the newly acquired data from memory 700. At time 950, the control module 400 transfers the newly acquired data from memory 700 to the analysis system 302.

As shown in the timing diagram, time efficiency is improved by acquiring the test data independent of analyzing the test data. Furthermore, skilled artisans will recognize that more or less predetermined sequences may be used when multitasking the acquisition and analysis of the test data from the DUT 308.

Figure 10:
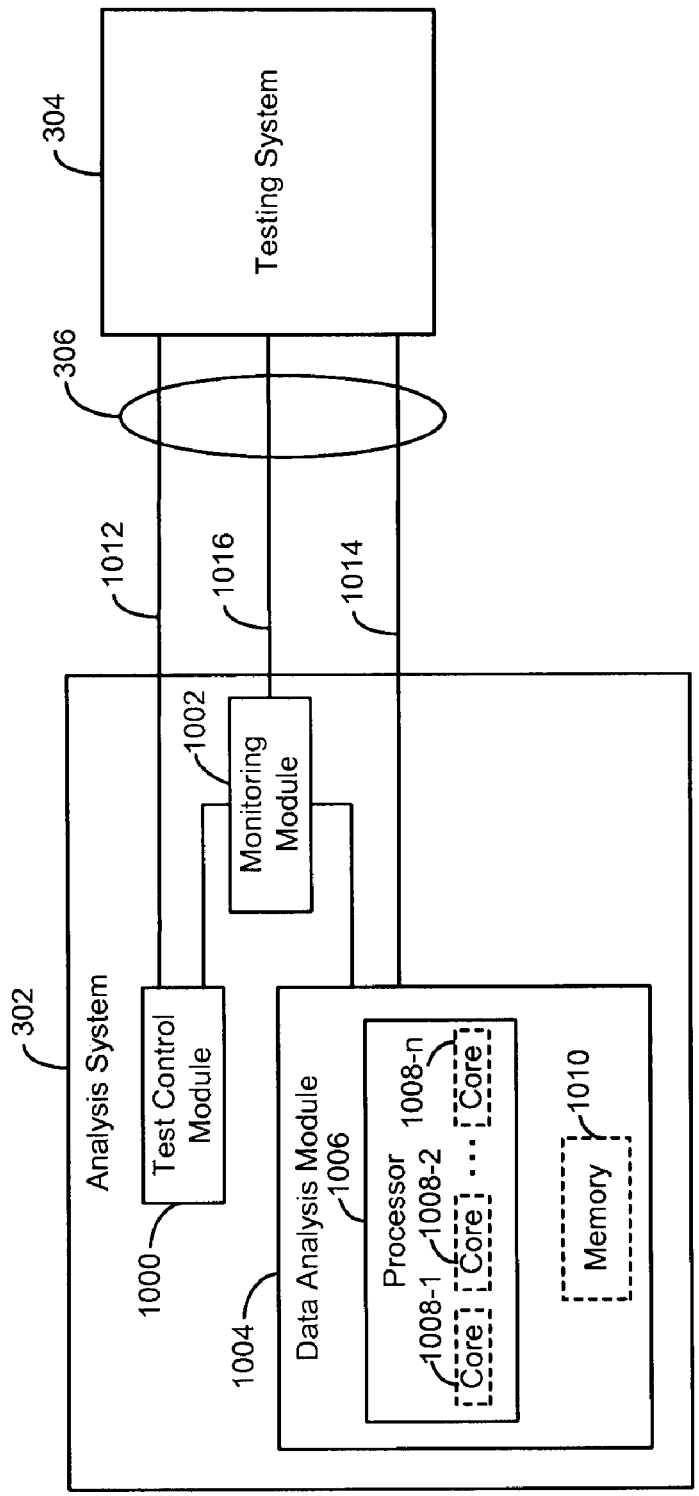
FIG. 10 is an exemplary functional block diagram of an analysis system associated with the system for testing a wireless communication device according to the presently claimed invention.
Figure 11:
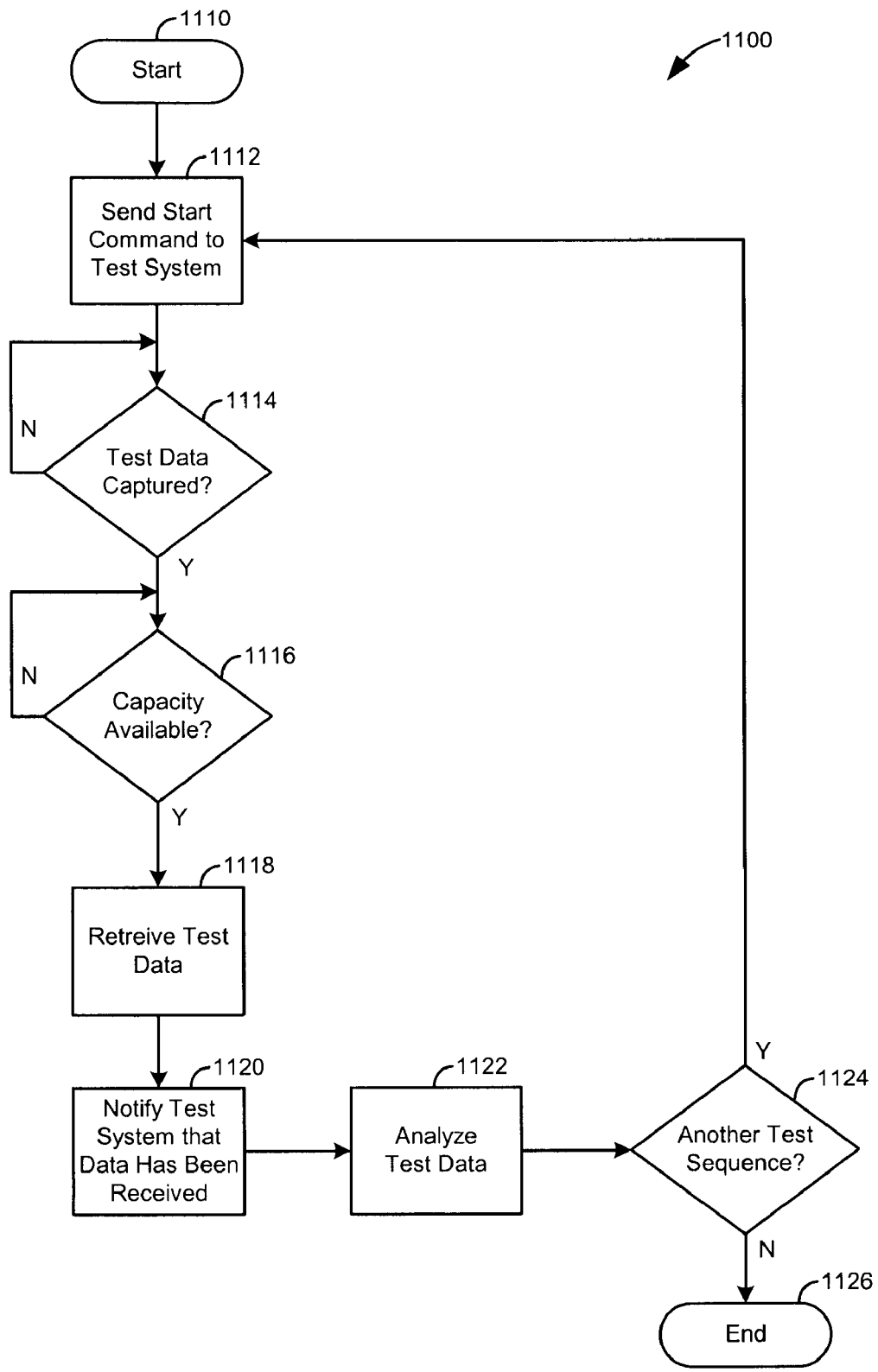
FIG. 11 is a flowchart depicting exemplary steps that can be taken by the analysis system of FIG. 10.

Referring now to FIG. 10, the analysis system 302 includes a test control module 1000, a monitoring module 1002, and a data analysis module 1004. The data analysis module 1004 includes a processor 1006. The monitoring module 1002 is operatively coupled to the test control module 1000 and the data analysis module 1004. The test control module 1000, monitoring module 1002, and data analysis module 1004 are operatively coupled to the testing system via interface 306.

In some embodiments, the processor 1006 includes one or more processing cores 1008-1, 1008-2, . . . , 1008-$n$. Each processing core 1008 is operative to process and analyze test data simultaneously. In addition, some embodiments include memory 1010 that stores test data until the processor 1006 is capable of processing and/or analyzing the test data (e.g., the processor 1006 or at least one processing core 1008 is not currently processing and analyzing test data).

During operation, the test control module 1000 communicates a start test signal 1012 to the testing system 304 via interface 306. In response to the start test signal 1008, the testing system 304 acquires test data based on interactions with the DUT 308.

The monitoring module 1002 monitors capacity of the data analysis module 1004. More specifically, the monitoring module 1002 monitors whether the data analysis module 1006 has capacity to receive test data 1014 via the interface 306. In some embodiments, the data analysis module 1004 has capacity to receive the test data 1014 when the processor 1006 or at least one processing core 1008 is not processing and/or analyzing test data. In other embodiments, the data analysis module 1004 has capacity when there is sufficient capacity to store the test data 1014 in memory 1010.

Once the testing system 304 has acquired the test data 1014, the testing system 304 sends a sequence complete signal 1016 via interface 306 indicating that the predetermined test sequence is complete. The monitoring module 1002 requests the testing system 304 to transfer the test data 1014 when the sequence complete signal 1016 indicates that the predetermined test sequence is complete and when the data analysis system 1004 has capacity. Once the test data 1014 is transferred to the data analysis module 1006, the testing system 304 can acquire additional test data based on another predetermined test sequence.

Referring now to FIG. 1, a flowchart depicting exemplary steps that can be taken by the analysis system 302 is generally identified at 1100. The process starts in step 1110 when the test control module 1000 communicates the start test signal 1012. In step 1112, the test control module 1000 communicates the start test signal 1012 to the testing system 304. In step 1114, the analysis system 302 determines whether the testing system 304 has acquired test data for a predetermined sequence. More specifically, the monitoring module 1002 determines that the testing system 304 has acquired test data for the predetermined sequence when the sequence complete signal 1016 is received. If data analysis system 302 determines that the testing system 304 has not acquired test data for the predetermined sequence, the process returns to step 1114. However, if the testing system 304 has acquired test data for the predetermined sequence, the monitoring module 1002 determines whether the data analysis module 1004 has capacity for the test data in step 1116. As previously discussed, the data analysis system has capacity when the processor 1006 or at least one processing core 1008 is not processing and/or analyzing test data or when there is capacity in memory 1010 to store the test data 1014.

If the data analysis module 1004 does not have capacity, the process returns to step 1116. However, if the data analysis module 1004 does have capacity, the data analysis module 1004 requests the test data 1014 in step 1118. In step 1120, the data analysis module 1004 notifies the testing system 304 that the test data of the predetermined sequence has been received. The processor 1006 processes and analyzes the test data 1014 in step 1122.

In step 1124, the analysis system 302 determines whether to perform an additional predetermined sequence. If the analysis system 302 determines to perform an additional predetermined sequence, the process returns to step 1114. However, if the analysis system 302 determines not to perform an additional predetermined sequence, the process ends in step 1126.

Figure 12:
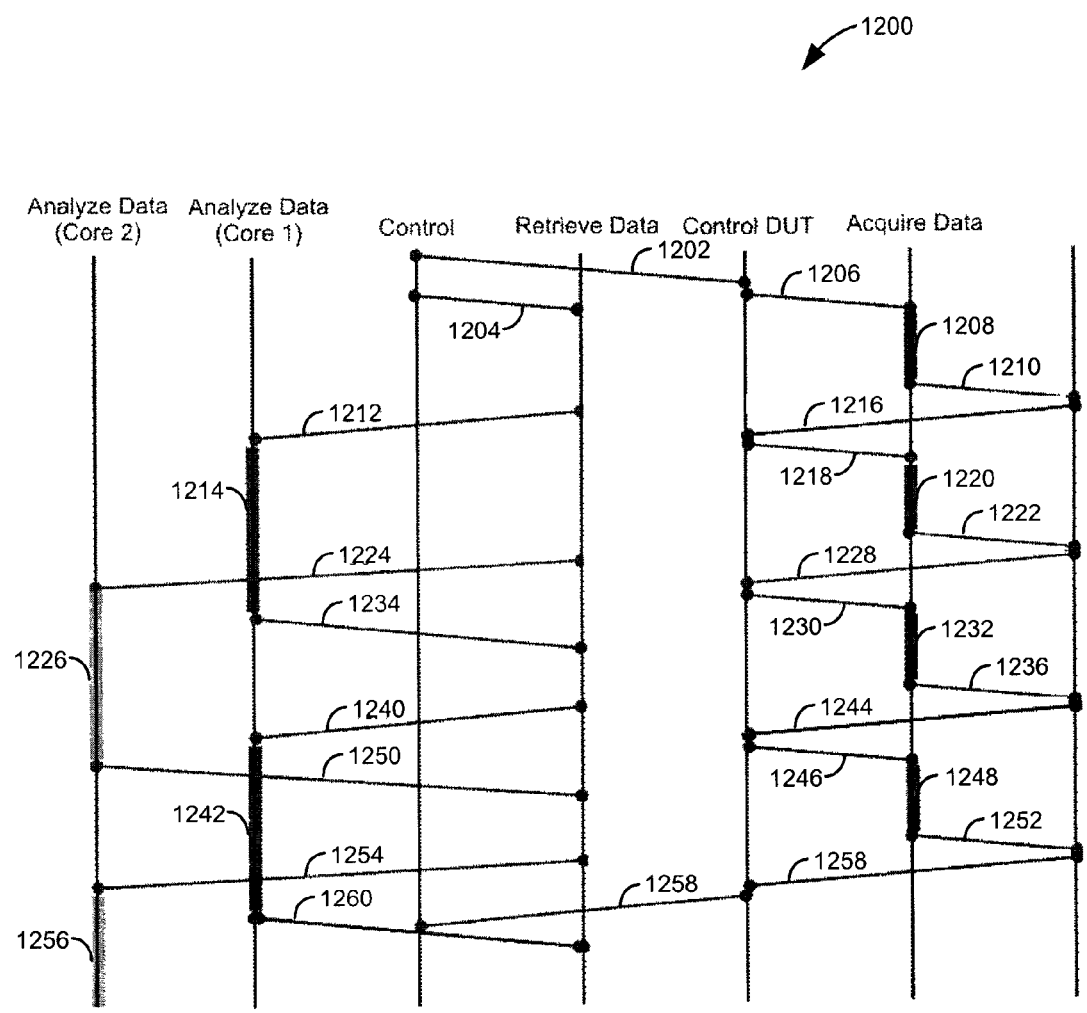
FIG. 12 is an exemplary timing diagram of the system of FIG. 10 testing a wireless communication device according to one embodiment of the present disclosure.

Referring now to FIG. 12, a timing diagram of the system 300 using the analysis system 302 having multiple processing cores 1008 is generally identified at 1200. In this example, the processor 1006 includes two processing cores 1008, however more or less processing cores 1008 may be included. At time 1202, the testing system 304 begins to test the DUT 308 in response to receiving the start test signal 1012 from the analysis system 302. The analysis system 302 subsequently requests a transfer of test data from the testing system 304 at time 1204.

The control module 400 initiates a first test sequence at time 1206. During time 1208 the testing module 402 transmits one or more transmit test signals 410 based on the first test sequence. In addition, the measurement module 404 acquires test data based on one or more test signals 412 that are based on the transmit test signals 410 during time 1208. At time 1210, the measurement module 404 stores the acquired test data in memory 700. At time 1212, the control module 400 transfers the test data 1014 from memory 700 to the analysis system 302. Once the test data 1014 has been transferred to the analysis system 302, processing core 1008-1 processes and analyzes the test data 1014 during time 1214.

In parallel to the analysis system 302 analyzing the test data, the control module 400 begins an additional test of the DUT 308 at time 1216. The control module 400 initiates an a second predetermined test sequence at time 1218. During time 1220 the testing module 402 transmits one or more transmit test signals 410 based on the second test sequence. In addition, the measurement module 404 acquires test data based on one or more test signals 412 that are based on the transmit test signals 410 during time 1220.

At time 1222, the measurement module 404 stores the newly acquired test data in memory 700. At time 1224, the control module 400 transfers the test data 1014 from memory 700 to the analysis system 302. Once the test data 1014 has been transferred to the analysis system 302, processing core 1008-2 processes and analyzes the test data 1014 during time 1226.

In parallel to the analysis system 302 analyzing the test data, the control module 400 begins an additional test of the DUT 308 at time 1228. The control module 400 initiates a third predetermined test sequence at time 1230. During time 1232 the testing module 402 transmits one or more transmit test signals 410 based on the third test sequence. In addition, the measurement module 404 acquires test data based on one or more test signals 412 that are based on the transmit test signals 410 during time 1232.

At time 1234, processing core 1008-1 finishes processing and analyzing the test data and requests a transfer of newly acquired test data from the testing system 304. At time 1236, the measurement module 404 stores the newly acquired test data in memory 700. At time 1240, the control module 400 transfers the test data 1014 from memory 700 to the analysis system 302. Once the test data 1014 has been transferred to the analysis system 302, processing core 1008-1 processes and analyzes the test data 1014 during time 1242.

In parallel to the analysis system 302 analyzing the test data during time 1242, the control module 400 begins an additional test of the DUT 308 at time 1244. The control module 400 initiates a fourth predetermined test sequence at time 1246. During time 1248 the testing module 402 transmits one or more transmit test signals 410 based on the fourth test sequence. In addition, the measurement module 404 acquires additional test data based on one or more test signals 412 that are based on the transmit test signals 410 during time 1248.

At time 1250, processing core 1008-2 finishes processing and analyzing test data and requests a transfer of newly acquired test data from the testing system 304. At time 1252, the measurement module 404 stores the newly acquired test data in memory 700. At time 1254, the control module 400 transfers the test data 1014 from memory 700 to the analysis system 302. Once the test data 1014 has been transferred to the analysis system 302, processing core 1008-2 processes and analyzes the test data 1014 during time 1256.

At time 1258, the testing system 304 notifies the analysis system 302 that the test of the DUT 308 is complete. At time 1260, processing core 1008-1 finishes analyzing the previously acquired data and requests the control module to transfer the any newly acquired data from memory 700.

As shown in the timing diagram, time efficiency is improved by using multiple processing cores to analyze test data while the testing system acquires the test data. Furthermore, skilled artisans will recognize that more or less predetermined sequences may be used when multitasking the acquisition and analysis of the test data from the DUT 308.

As noted above, time efficiency of the system is increased. The increased time efficiency allows for a wireless DUT to be tested more quickly than by conventional systems and method. In addition, by multitasking the acquisition and analysis of test data, time efficiency can be further improved. Other advantages will be recognized by those of ordinary skill in the art.

Although the aforementioned examples refer to testing transmission of the DUT, skilled artisans will appreciate that a similar approach can be used to test reception of the DUT (e.g., sending an acknowledgement signal in response to receiving a test signal). Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A system for testing a communication device, comprising:
   a testing module that is operative to transmit to a communication device one or more first test signals based on a first test sequence;

a measurement module that is operative to acquire test data by receiving one or more second test signals from said communication device that are based on said one or more first test signals; and a control module that is operative to:
initiate said first test sequence in response to receiving a start test signal from an analysis system;
transfer said test data to said analysis system in response to a transfer data request; and
initiate a second test sequence while said analysis system is analyzing said test data, wherein said testing module is operative to transmit to said communication device one or more third test signals based on said second sequence when said second test sequence has been initiated.

2. The system of claim 1 further comprising memory that is operative to store said test data.

3. The system of claim 1 wherein said control module is operative to send a sequence complete signal to said analysis system when said test data has been acquired.

4. The system of claim 1 wherein said analysis system comprises:
a test control module that is operative to communicate said start test signal to said testing system;
a data analysis module that is operative to analyze said test data acquired by said testing system; and
a monitoring module that is operative to monitor capacity of said data analysis module and to request transfer of said test data from said testing system to said analysis system when said capacity is sufficient to analyze said test data and when a sequence complete signal indicates that a predetermined test sequence is complete.

5. The system of claim 4 wherein said capacity is sufficient when said data analysis module is not analyzing said test data.

6. The system of claim 4 wherein said capacity is sufficient when at least one processor core of said data analysis module is not analyzing said test data.

7. The system of claim 4 wherein said data analysis module further comprises memory and wherein said capacity is sufficient when said memory has capacity to store said test data.

8. A system for testing a communication device, comprising:
a test control module that is operative to communicate a start test signal to a testing system;
a data analysis module that is operative to analyze test data previously acquired by said testing system from a communication device while said testing system acquires additional test data from said communication device based on a second test sequence; and
a monitoring module that is operative to monitor capacity of said data analysis module and to request a transfer of said test data from said testing system to said data analysis module when said capacity is sufficient to analyze said test data and when a sequence complete signal is received from said testing system indicating that a predetermined test sequence is complete.

9. The system of claim 8 wherein said capacity is sufficient when said data analysis module is not analyzing said test data.

10. The system of claim 8 wherein said capacity is sufficient when at least one processor core of said data analysis module is not analyzing said test data.

11. The system of claim 8 wherein said data analysis module further comprises memory and wherein said capacity is sufficient when said memory has capacity to store said test data.

12. The system of claim 8 wherein said testing system comprises:

a testing module that is operative to transmit to said communication device one or more first test signals based on a first test sequence;
a measurement module that is operative to acquire said test data by receiving from said communication device one or more second test signals that are based on said one or more first test signals; and
a control module that is operative to:
initiate said first test sequence in response to receiving said start test signal;
transfer said test data in response to a transfer data request; and
initiate said second test sequence while said data analysis module is analyzing said test data, wherein said testing module is operative to transmit to said communication device one or more third test signals based on said second test sequence when said second test sequence has been initiated.

13. The system of claim 12 further comprising memory that is operative to store said test data.

14. The system of claim 12 wherein said control module is operative to send said sequence complete signal to said monitoring module when said test data has been acquired.

15. A method for testing a communication device, comprising:
initiating a first test sequence in response to receiving a start test signal from an analysis system;
transmitting to a communication device one or more first test signals based on said first test sequence;
acquiring test data by receiving from said communication device one or more second test signals that are based on said one or more first test signals;
transferring said test data to said analysis system in response to a transfer data request;
initiating a second test sequence while said analysis system is analyzing said test data; and
transmitting to said communication device one or more third test signals based on said second test sequence when said second test sequence has been initiated.

16. The method of claim 15 further comprising storing said test data.

17. The method of claim 15 further comprising sending a sequence complete signal when said test data has been acquired.

18. A method for testing a communication device, comprising:
communicating a start test signal to a testing system;
analyzing test data previously acquired by said testing system from a communication device, wherein said previously acquired test data is analyzed while said testing system acquires additional test data from said communication device;
monitoring capacity of a data analysis module; and
requesting a transfer of said test data from said testing system when said capacity is sufficient to analyze said test data and when a sequence complete signal is received from said testing system indicating that a predetermined test sequence is complete.

19. The method of claim 18 wherein said capacity is sufficient when said test data is not being analyzed.

20. The method of claim 18 wherein said capacity is sufficient when at least one processor of said data analysis module is not analyzing said test data.

21. The method of claim 18 wherein said capacity is sufficient when there is sufficient capacity to store said test data.

* * * * *